June 27, 1967      B. A. RASMUSSEN      3,327,980
SUPPORTING STAND FOR AN INDEPENDENT COLUMN
Filed June 2, 1965
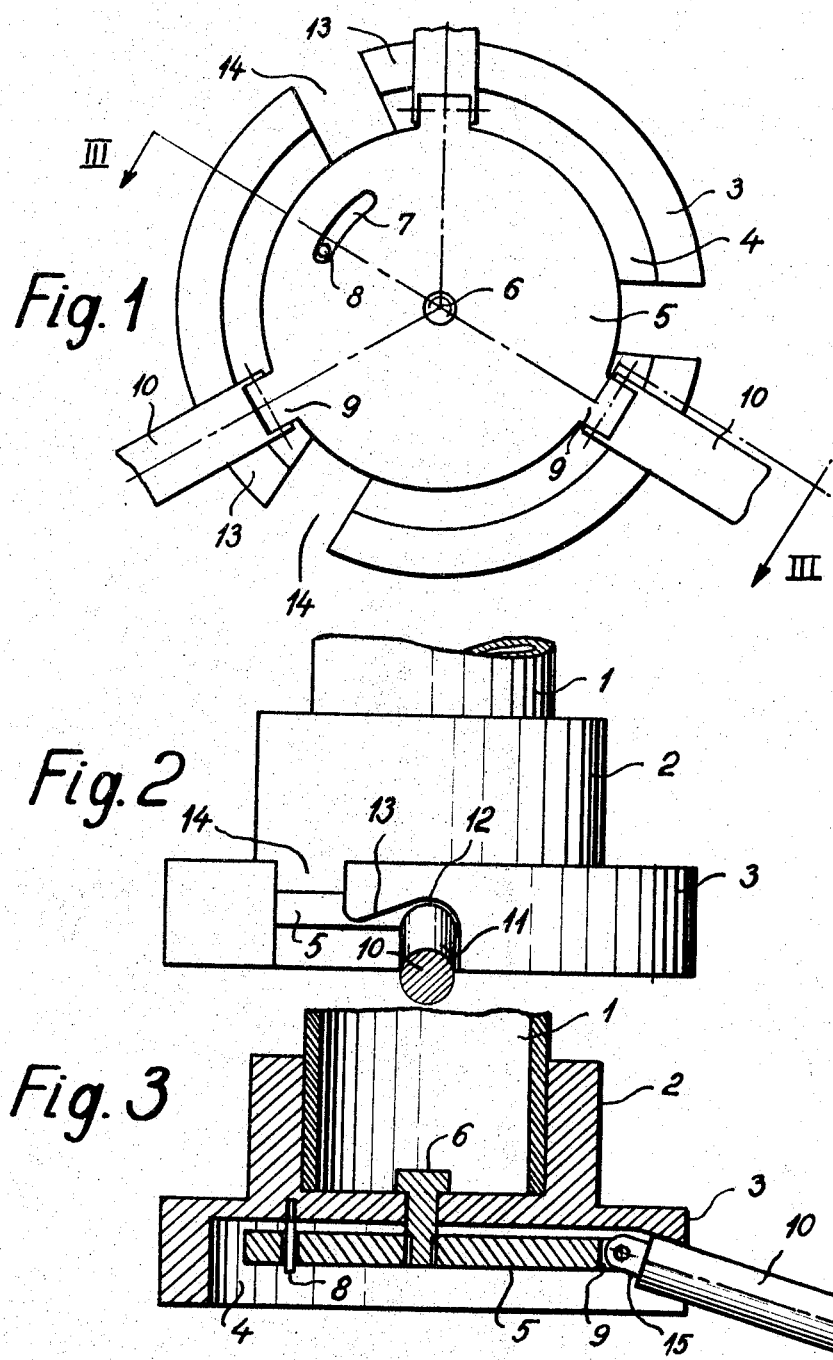
INVENTOR
BENNY ALLAN RASMUSSEN
BY Otto John Munz
ATTORNEY

United States Patent Office 3,327,980
Patented June 27, 1967

3,327,980
SUPPORTING STAND FOR AN INDEPENDENT COLUMN
Benny Allan Rasmussen, Copenhagen, Denmark, assignor to Jomi Industri A/S, Copenhagen, Denmark
Filed June 2, 1965, Ser. No. 460,694
5 Claims. (Cl. 248—168)

This invention relates to a supporting stand for an independent column. In particular, this invention relates to a support stand for an independent column having three or more legs such as are employed as support stands for electric hair dryers, mercury quartz lamps, electric fans, and the like.

Previously known collapsible supporting bases for independent columns had three or more legs adapted to be pivoted downward and inward toward the column axis to the folded, nonsupporting position. In the supporting position, the legs were prevented from swinging away from each other by means of abutments or connecting members positioned between the legs. With this device, the folded legs formed an extension of the lower end of the column, and the column with folded legs had a greater length than the column, making storage difficult.

It is an object of htis invention to provide a supporting stand for an independent column wherein the legs pivotally fold upward and inward toward the column, whereby the folded assembly has the length of the column and storage is facilitated.

It is another object of this invention to provide a supporting stand for an independent column having at least three legs which can be unfolded to a supporting position and folded to a non-supporting position with ease, the entire assembly having a construction which is inexpensive and trouble-free.

It is still another object of this invention to provide a supporting stand for an independent column having at least three legs comprising an upper support means for receipt of the column, a lower support means supportingly attached to said upper support means for rotation with respect thereto about the longitudinal axis of the column, and at least three legs, each leg mounted on said lower support for separate pivotal movement about the horizontal axis.

The upper support means has a plurality of slot means for permitting upward pivotal movement of the legs to a folded position along the column when the legs are aligned therewith. The upper support means also has a plurality of bottom recess means, angularly displaced with respect to the respective slot means, for preventing upward movement of the legs aligned therewith from an unfolded, supporting position.

These and other objects and purposes of this invention will be understood by those acquainted with the design and construction of column support structures upon reading the following specification and the accompanying drawings.

In the drawings:

FIGURE 1 is a bottom view of the supporting stand structure.

FIGURE 2 is a side view of the supporting stand structure.

FIGURE 3 is a side sectional view of the supporting stand structure taken along line III—III of FIG. 1.

The advantages obtained with the device of this invention are derived because the stand comprises an upper support structure and a lower support structure rotatable with respect to the upper support structure about the axis of the column. The legs are mounted on the lower support structure and are pivotable about separate, substantially horizontal axes. The upper support structure has a set of slots for the legs enabling them to be folded upward and inward along the column, and another set of bottom recesses, each having a certain angular displacement with respect to a respective slot. The bottom recesses form a rest for the respective leg in the unfolded, supporting position, preventing upward pivotal movement of the leg from the supporting position.

The legs are folded by swinging them downward out of the bottom recesses after having lifted the column from the floor. Then the lower supporting structure is rotated until the legs are aligned with the slots. The legs are then pivoted upward and inward alongside the column. It is immaterial which of the support structures has the slots and recesses and which has the legs pivotally attached thereto, but both elements must be secured against axial movement along the column. The structure is very compact and dependable since the lower surfaces of the bottom recesses form very effective abutments for the legs.

In one embodiment of this invention, the pivot joints for the legs are hidden from view to provide a more attractive assembly. The upper part of the upper support structure consists of a socket for receipt of the column. The column is generally attached in place in the socket. The lower end of the socket comprises a radially extending intermediate portion and a downwardly extending cylindrical portion concentric with the column axis. The lower end of this flange structure is provided with both the slots and the recesses. The cylindrical portion defines a cylindrical recess for receipt of the lower support structure. The lower support structure is a type of turntable centrally mounted for rotation by a journal connection located axially with respect to the column. The periphery of the turntable is provided with outward extending projections to which the inner ends of the legs are pivotally connected. When viewed from the top, only the column, the socket and the outer ends of the legs are visible, and the turntable and the inner ends of the legs are hidden.

In order to facilitate folding of the supporting legs, the lower edge of the flange can define a smooth guiding surface means between each set of slot means and recess means for guiding the movement of the respective leg therebetween. The guiding face of each guiding surface extends without interruption from the bottom surface of the recess to the edge adjacent the respective slot. With this arrangement, the column can be lifted and inverted and a single leg can be rotated. The turntable will then be rotated, causing movement of the other legs along the guiding surfaces toward the slot. When the legs are aligned with the slots, the legs are folded down alongside the column, one by one. The pivot joints for the legs are formed with rivets, for example, which are sufficiently tight to provide a suitable friction to retain the legs in the folded position.

Referring to the figures, the lower end of the tubular column 1 is secured in a socket 2. The intermediate portion of the support structure below the socket extends radially outward. The remainder of the flange is the downward extending cylindrical portion 3 which is concentric with the column axis. The flange defines a central cylindrical recess 4 in the underside thereof. A central turntable 5 is positioned within the recess and is rotatably mounted on a screw or bolt 6, the head of which is housed in the hollow column 1. The turntable rotates from a first position wherein the legs are aligned with respective slots to a second position wherein the legs are aligned with respective recesses. Rotation of the turntable beyond these positions is prevented by means of a slot 7 having the shape of a portion of a circle which cooperates with a pin 8 attached to flange 3. Alternatively, the slot can be located in the flange 3 and the pin can be screwed into the turntable 5.

For use with three legs, the turntable 5 has along the periphery thereof three projections 9 spaced 120 degrees apart. A rivet 15 is received in a tangentially extending hole in each projection. A tubular leg is pivotally mounted on the ends of each rivet.

In the figures the supporting stand of this invention is shown in the supporting position with each leg 10 resting in a bottom recess 11 in the flange 3. The bottom surface 12 of the bottom recess is joined with a continuously extending guiding face 13 which guides movement of the leg in the circumferential direction. The lower surface 12 of the bottom recess 11 slopes at an angle parallel to the longitudinal axis of the respective legs in the unfolded position, and the lower surface 12 abuts the upper surfaces of the respective legs, maintaining them in the supporting position.

The guiding surface 13 terminates in a rounded portion leading into the slot 14 in the flange 3. The slot 14 extends radially to the exterior of the socket 2.

The socket 2, flange 3, and turntable 5 can be made from either metal or plastic, but the legs 10 and the column 1 are usually made of metal such as steel or aluminum.

The legs can be folded from the supporting position shown in the figures by swinging one of the legs 10 around the longitudinal axis of the column 1 after the column has been inverted. The turntable 5 will then rotate with the remainder of the legs 10, the remainder of the legs following the guiding surfaces 13. When the legs 10 are aligned with the slots 14, the end of the slot 7 will strike the pin 8, stopping rotation of the turntable 5. The legs can then be swung alongside the column, one by one, passing through the slots 14. The legs will then have been folded into a close contact with the socket 2. The rivets 15 provide sufficient friction to maintain the legs 10 in the folded position. When the supporting stand is to be used, the reversed operation is performed. When the legs 10 have become aligned with the bottom recesses 11, the other end of the slot 7 will strike the pin 8, so that further rotation of the turntable 5 is prevented.

Obviously many modifications and variations of the invention as hereinabove set forth can be made without departing from the essence and scope thereof, and only such limitations should be applied as are indicated in the claims.

The invention claimed is:

1. A supporting stand for an independent column comprising an upper support means for receipt of a column, a lower support means supportingly attached to said upper support means for rotation with respect thereto about a vertical axis, at least three legs, each leg mounted on said lower support for separate pivotal movement about a horizontal axis, said upper support means having a plurality of slot means for permitting upward pivotal movement of the legs to a folded position along the column when the legs are aligned therewith, said upper support means having a plurality of bottom recess means, angularly displaced with respect to respective slot means, for preventing upward movement of the legs aligned therewith from an unfolded, supporting position, the upper support means comprising a socket for receipt of a column, the lower end of said socket comprising a downwardly extending annular flange having said plurality of slot means and said plurality of said recess means, said flange defining a lower cylindrical recess, said lower support means being positioned within said lower cylindrical recess.

2. The supporting stand of claim 1 wherein the lower support means is a circular plate having outwardly extending projections to which the legs are pivotally attached.

3. The supporting stand of claim 1 wherein the downwardly extending annular flange comprises a cylindrical sleeve portion having said bottom recess means, the bottom recess means having lower surfaces sloped at an angle parallel to the longitudinal axis of said respective legs when they are in the unfolded, supporting position, and the lower surfaces contact the upper surfaces of the respective legs when they are in the supporting position.

4. The supporting stand of claim 1 wherein the downwardly extending annular flange defines a guiding surface means between each set of slot means and bottom recess means for guiding movement of each respective leg between the bottom recess means and the slot means when the lower support means is rotated.

5. The supporting stand of claim 1 wherein the lower support means is rotatable from a first position wherein the legs are aligned with respective slot means to a second position wherein the legs are aligned with respective bottom recess means, and said upper support means and lower support means are provided with a pin and slot means for preventing rotation of said lower support means beyond said first and second positions.

References Cited

UNITED STATES PATENTS 2,653,000   9/1953   Cadwell et al. _____ 248—168

JOHN PETO, *Primary Examiner.*